(12) United States Patent
Herrala

(10) Patent No.: US 8,710,980 B2
(45) Date of Patent: Apr. 29, 2014

(54) ASSET CONTROL IN LOCATION TRACKING SYSTEM

(75) Inventor: Sami Herrala, Oulu (FI)

(73) Assignee: 9Solutions Oy, Oulu (FI)

( * ) Notice: Subject to any disclaimer, the term of this patent is extended or adjusted under 35 U.S.C. 154(b) by 335 days.

(21) Appl. No.: 13/303,880

(22) Filed: Nov. 23, 2011

(65) Prior Publication Data

US 2012/0161963 A1   Jun. 28, 2012

(30) Foreign Application Priority Data

Nov. 25, 2010 (EP) .................................... 10192525

(51) Int. Cl.
  *G08B 1/08* (2006.01)
  *G08B 13/14* (2006.01)
  *G05B 23/00* (2006.01)
  *H04Q 1/00* (2006.01)

(52) U.S. Cl.
  USPC ............... 340/539.13; 340/539.1; 340/572.1; 340/568.5; 340/571; 340/5.21; 340/5.51; 340/5.73

(58) Field of Classification Search
  None
  See application file for complete search history.

(56) References Cited

U.S. PATENT DOCUMENTS

| | | | |
|---|---|---|---|
| 7,034,683 B2 | 4/2006 | Ghazarian | |
| 7,277,889 B2 * | 10/2007 | Addonisio et al. | 1/1 |
| 7,920,063 B2 * | 4/2011 | Ulrich | 340/572.1 |
| 7,932,824 B2 * | 4/2011 | Flores et al. | 340/572.1 |
| 8,089,341 B2 * | 1/2012 | Nakagawa et al. | 340/5.7 |
| 2004/0150508 A1 * | 8/2004 | Mosgrove et al. | 340/5.21 |
| 2004/0193449 A1 * | 9/2004 | Wildman et al. | 705/2 |
| 2006/0184376 A1 * | 8/2006 | Graves et al. | 705/1 |
| 2007/0088632 A1 * | 4/2007 | Page, Jr. | 705/28 |
| 2009/0327102 A1 * | 12/2009 | Maniar et al. | 705/28 |

FOREIGN PATENT DOCUMENTS

| | | |
|---|---|---|
| EP | 1 783 570 A1 | 5/2007 |
| WO | WO 2006/084373 A1 | 8/2006 |

OTHER PUBLICATIONS

Extended European Search Report dated Sep. 19, 2011 issued in European Application No. 10192525.3.

* cited by examiner

*Primary Examiner* — Julie Lieu
(74) *Attorney, Agent, or Firm* — Sughrue Mion, PLLC

(57) ABSTRACT

The present invention provides a method for changing a usability status of an asset in a location tracking system. Establishment of a direct device-to-device wireless communication connection between a user tag and an asset tag of the location tracking system triggers a process to change a usability status of the asset associated with the asset tag. In the process, identifiers of the asset tag and the user tag obtained when pairing the asset tag and the user tag are used in order to link the user tag with the asset tag in the process for changing the usability status of the asset.

14 Claims, 5 Drawing Sheets

ASSET CONTROL IN LOCATION TRACKING SYSTEM

FIELD

The invention relates to the technical field of location tracking systems.

BACKGROUND

Prior art teaches several types of location tracking systems. Satellite based tracking systems, e.g. Global Positioning System (GPS), are probably the most common location tracking systems. However, their problem is that they are not suitable for indoor location tracking, because GPS signals do not penetrate building walls. For indoors location tracking, prior art teaches systems that utilize a pico network of wireless base stations, and the location of a given person in the coverage area of the pico network is determined on the basis of which wireless base station currently serves a personal communication device of the person. Prior art also teaches location tracking systems based on radio frequency identification (RFID) where a RFID readers are disposed to cover an area in which the location tracking is to be carried out. RFID tags are associated with monitored subjects, e.g. human beings and assets such as equipment.

With respect to expensive equipment or other assets, a person utilizing the equipment may have to sign a reservation of such equipment before they can be taken into use so that it may be tracked who is responsible for them at a time. Conventionally, the reservation is made by using a computer. In such cases, the equipment that is to be reserved, needs to be found in a computer database and its reservation status and personal information of the reserving person needs to be entered manually, which is complicated.

BRIEF DESCRIPTION

The present invention provides a location tracking system that provides a convenient and fast change of a usability status of an asset.

According to an aspect, there is provided a method for changing a usability status of an asset in a location tracking system, the method comprising: establishing a direct device-to-device wireless communication connection between a user tag associated with a person and an asset tag associated with an asset in the location tracking system, wherein the user tag is used for monitoring the location of the person, and the asset tag is used for monitoring locations of the asset, and wherein the establishment comprises pairing the user tag and the asset tag; and triggering by the establishment of the wireless communication connection a process to change a usability status of the asset associated with the asset tag, wherein identifiers of the asset tag and the user tag obtained when pairing the asset tag and the user tag are used to link the user tag with the asset tag when changing the usability status of the asset.

According to another aspect, there is provided a location tracking system comprising: a server comprising at least one processor and at least one memory including program instructions, wherein the at least one memory and the computer program code are configured, with the at least one processor, to cause the server to track, in a coverage area of the location tracking system, locations of at least one user tag and at least one asset tag, and to communicate with the at least one user tag and the at least one asset tag; an asset tag associated with an asset and comprising at least one processor and at least one memory including program instructions, wherein the at least one memory and the computer program code are configured, with the at least one processor, to cause the asset tag to establish a direct device-to-device wireless communication connection with a user tag, wherein the establishment comprises pairing the user tag and the asset tag; and said user tag associated with a person and comprising at least one processor and at least one memory including program instructions, wherein the at least one memory and the computer program code are configured, with the at least one processor, to cause the user tag to establish the direct device-to-device wireless communication connection with said asset tag, to trigger by the establishment of the wireless communication connection a process to change a usability status of the asset associated with the asset tag, and to use identifiers of the asset tag and the user tag obtained when pairing the asset tag and the user tag to link the user tag with the asset tag when changing the usability status of the asset.

According to yet another aspect, there is provided a wireless communication device comprising: at least one processor; and at least one memory including program instructions, wherein the at least one memory and the computer program code are configured, with the at least one processor, to cause the apparatus to establish a direct device-to-device wireless communication connection between a user tag associated with a person and an asset tag associated with an asset in the location tracking system, wherein the user tag is used for monitoring the location of the person, and the asset tag is used for monitoring locations of the asset, to pair the user tag and the asset tag during the establishment of the direct device-to-device wireless communication connection, to trigger by the establishment of the wireless communication connection a process to change a usability status of the asset associated with the asset tag, and to use identifiers of the asset tag and the user tag obtained when pairing the asset tag and the user tag to link the user tag with the asset tag when changing the usability status of the asset.

According to yet another aspect, there is provided a computer program product embodied on a non-transitory distribution medium readable by a computer and comprising program instructions which, when loaded into an apparatus, execute a computer process comprising: causing establishment of a direct device-to-device wireless communication connection between a user tag associated with a person and an asset tag associated with an asset in the location tracking system, wherein the user tag is used for monitoring the location of the person, and the asset tag is used for monitoring locations of the asset, and wherein the establishment comprises pairing the user tag and the asset tag; and triggering by the establishment of the wireless communication connection a process to change a usability status of the asset associated with the asset tag, wherein identifiers of the asset tag and the user tag obtained when pairing the asset tag and the user tag are used to link the user tag with the asset tag when changing the usability status of the asset.

Embodiments of the invention are defined in the dependent claims.

LIST OF DRAWINGS

Embodiments of the present invention are described below, by way of example only, with reference to the accompanying drawings, in which FIG. 1 illustrates a location tracking system to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
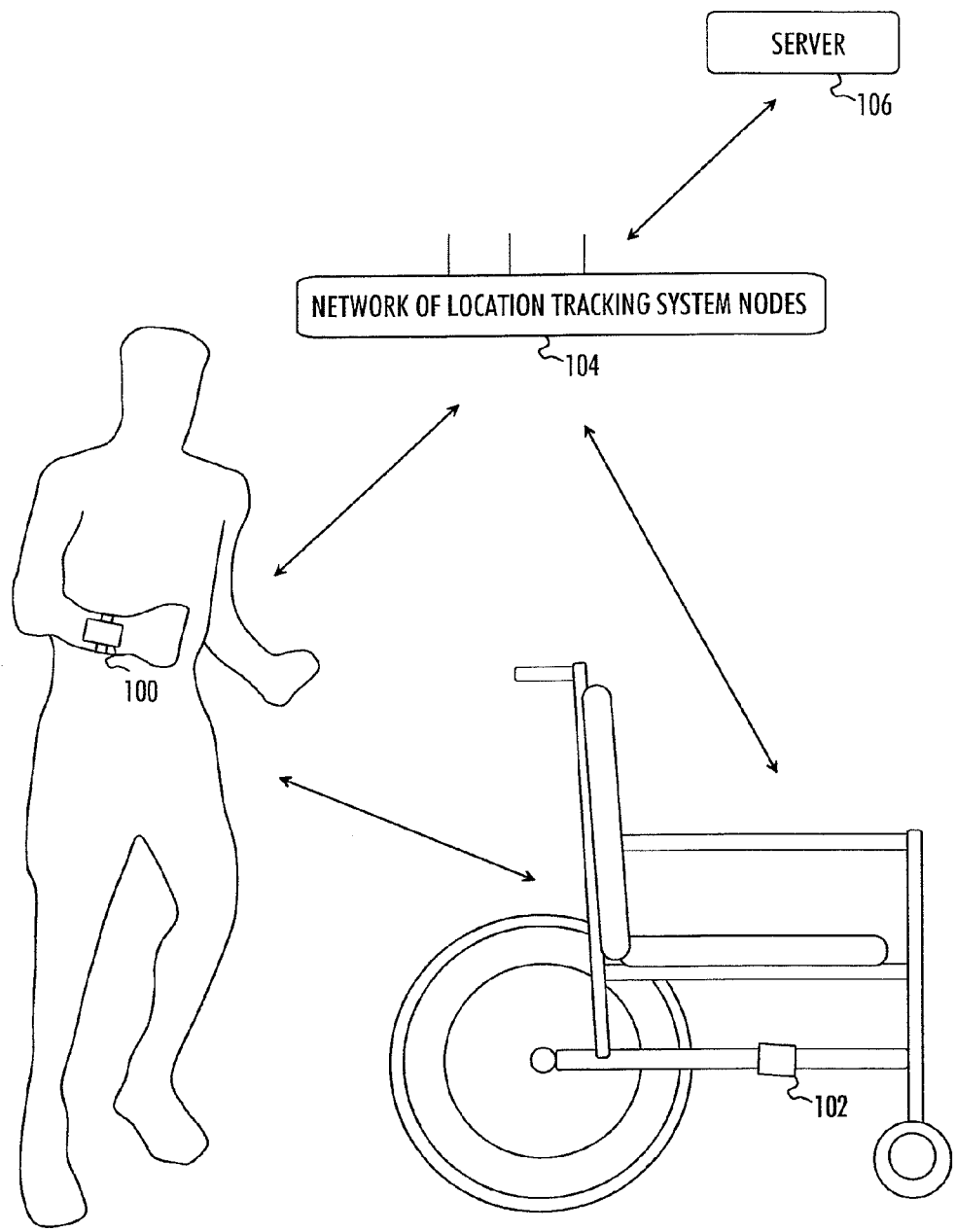

FIG. 1 illustrates a general scenario to which embodiments of the invention may be applied. Referring to FIG. 1, a system according to an embodiment of the invention comprises a location tracking system (LTS) which may be an indoor or outdoor location tracking system. A plurality of LTS nodes 104 may be disposed throughout an area in which the location tracking is carried out. The LTS nodes 104 may be radio communication devices each configured to provide a coverage area, and the combined coverage areas of the LTS nodes 104 cover the location tracking area. The LTS nodes 104 may also form a mesh network enabling data routing between the nodes 104 and through the nodes 104. A server 106 may be connected to the network of LTS nodes 104, and the server may be configured to maintain locations of tracked objects and control the location tracking and other features of the LTS. The server may be realized by a computer provided with suitable communication equipment so as to enable a communication connection with the LTS nodes 104. The server may be connected to a router via an Internet Porotocol (IP) connection, and the router may be configured to connect to the mesh network of LTS nodes 104 through another connection type. The connection in the mesh network of LTS nodes 104 may be configured to establish the mesh network according to a Bluetooth technology, but it should be understood that other radio communication schemes may be used as well.

The locations of objects are tracked by tracking movement of tags attached to the objects. For example, a user tag 100 may be carried by a person, and an asset tag 102 may be attached to an asset. The asset may be any mobile or portable apparatus that is wanted to be tracked, e.g. a wheelchair, a computer, or expensive industrial testing equipment. The asset tag may equally be attached to a fixed apparatus, e.g. a safe, a projector, in order to detect attempted robbery. The location tracking may be based on a scheme where a tag is configured to detect the closest LTS node and to transmit to the server periodically a message comprising an identifier of the tag and an identifier of the detected closest LTS node. The message may be routed through the mesh network of LTS nodes 104 to the server 106. As, the server 106 is provided with information on fixed locations of the LTS nodes, e.g. in a layout of the area, the server is able to associate the tag with the LTS node on the basis of the received message and, thus, determine the location of the tag and the object associated with the tag. In another embodiment, an LTS node is configured to detect tags in its coverage area and transmit periodically identifiers of detected tags to the server. The detection of the LTS nodes or tags may be based on Bluetooth inquiry procedure. The LTS may, however, utilize another location tracking scheme. The user tag 100 and the asset tag 102 may also be configured to communicate with each other, as will be described in greater detail below.

Figure 2:
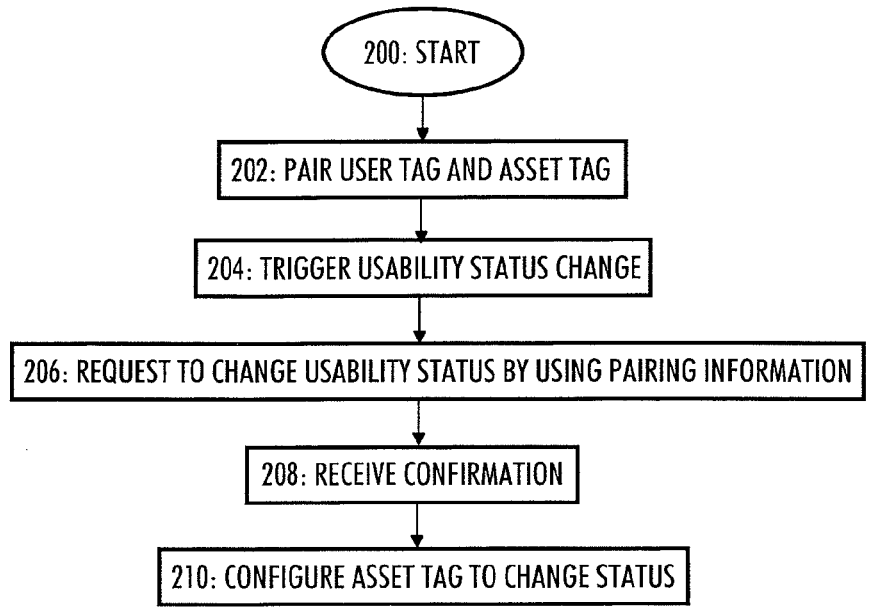
FIG. 2 illustrates a flow diagram of a process for changing the usability status of an asset according to an embodiment of the invention.

As mentioned in the Background, a conventional method for reserving an asset for use is to reserve it through a computer. This is cumbersome and may lead to problems where the asset is taken into use without actual reservation. A similar problem relates to maintenance of the assets. Conventionally, the asset to be fixed or serviced is manually taken to service when it is broken or according to a service schedule. However, when an asset is detected to be in need of service but a person detecting the need is not able to address the issue immediately, e.g. by taking it to the service or by notifying service personnel, the person may forget the issue and the broken asset may be still used although it would need servicing. Such a broken asset may be a safety hazard. FIG. 2 illustrates a flow diagram of a process for changing a usability status of the asset tag 102 according to an embodiment of the invention. The process may be carried out as a computer process in an apparatus according to an embodiment of the invention, or the process may be divided into a plurality of sub-processes, wherein each sub-process is carried out in an element of the above-mentioned location tracking system. Referring to FIG. 2, the process starts in block 200. In block 202, a wireless communication connection is established between a user tag and an asset tag. The wireless communication connection may be a direct device-to-device (D2D) connection, i.e. there are no relaying devices between the user tag and the asset tag. The connection may be a Bluetooth connection established according to the Bluetooth inquiry procedure, but it should be understood that other D2D wireless communication schemes may be applied. As a result of the connection establishment, the user tag and the asset tag are paired at least on a logical level, e.g. the devices are logically linked to each other through exchange of identifiers in the connection establishment procedure. The pairing may comprise a physical pairing as well, e.g. the completion of the establishment of the connection.

The establishment of the wireless communication connection triggers a process for changing a usability status of the asset associated with the asset tag in block 204. With respect to the process for changing the usability status, in block 206 requesting from a server of the location tracking system for permission to change the usability status of the asset. The request may be sent by the user tag and/or the asset tag. The request may be sent over a communication link between the server and the tag making the request. The request comprises identifiers of the asset tag and the user tag obtained when pairing the asset tag and the user tag to enable fast and convenient link between a device making the change of the usability status (the user tag) and the device whose usability status is to be changed (the asset tag). In block 208, a confirmation message comprising the permission to change the usability status is received from the server in the tag which sent the request. In response to the permission to change the usability status of the asset, the asset tag and/or the server is configured in block 210 to change the usability status of the asset. With respect to the server, the server may store in its database the updated status of the asset so as to monitor utilization and maintenance of the assets. With respect to the asset tag, different embodiments may be used. For example, when the user tag made the request, the user tag may be configured to transmit a command over the connection established in block 202 to change the usability status of the asset tag. In response to such a command, the asset tag changes its operational parameters according to the received command. When the asset tag made the request in block 206, the server may be configured to transmit a corresponding command to the asset tag and, in response to such a command, the asset tag changes its operational parameters according to the received command. In yet another embodiment where the asset tag made the request in block 206, the server may be configured to transmit the permission to the asset tag, in which case the asset tag may inform the user tag about the permission to change the usability status. In response to reception of the permission from the asset tag, the user tag may be configured to transmit the command over the connection established in block 202 to change the usability status of the asset tag. In response to the command, the asset tag changes its operational parameters according to the received command. Further embodiments for carrying out the communication and blocks of FIG. 2 will be described below.

The usability status may be a reservation status of the asset. In such embodiments, the reservation procedure of the asset may be triggered by establishing the connection in block 202, and the reserving person associated with the user tag and the reserved asset associated with the asset tag are immediately paired, which enables the reserving person to make the reservation in the location of the reserved asset by using only his/her user tag, and it avoids the need for the reserving person to browse through numerous assets in a reservation database to find the correct asset. As a consequence, the reservation process is fast and convenient, which inherently reduces the occurrence of taking the assets into use without registering the reservation. In this respect, the reservation procedure is triggered by the establishment of the D2D connection between the user tag and the asset tag, and the pairing carried out in the establishment of the D2D connection is used in the reservation process so as to link the reserving device (the user tag) and the reserved device (the asset tag). Upon completion of the reservation process, the asset of the asset tag becomes reserved by the user of the user tag. When the reservation process is completed, the D2D connection may be terminated. When the user no longer needs the asset, the user may simply reestablish the D2D connection in order to trigger the reservation release process. In the reservation release process, the asset tag is configured to set its reservation status to "free for reservation", and the server may also be notified about the release of the reservation to enable the server to update its reservation database. This enables the server also to monitor the utilization of the assets of the LTS, and the utilization status of different assets may be used when determining the needs for maintenance. Let us assume a conventional scheme where assets are serviced only on a timely basis. Some assets may be in regular use while other assets may have been without a use. Accordingly, some of the assets may be in dire need for servicing (even safety hazards), while others are practically in mint condition. In such scenario, it is difficult to optimize the maintenance separately for each asset. The system according to this embodiment allows the tracking of real utilization of the assets, and the maintenance may be easily mapped to the real-time utilization of the assets.

The reservation status may be understood also as an acknowledgment that a user is controlling/processing/handling the asset. The change of the usability or reservation status of the asset may be understood as an acknowledgment that the user currently associated with the tag is responsible for the asset associated with the tag. Such embodiments enable tracking the asset in its manufacturing process. For example, a tag may be attached to the asset early in its manufacturing process and, when the asset reaches a post in each stage of the manufacturing process, a person responsible for the post acknowledges the asset by changing its usability status according to embodiments of the invention. The asset may be, for example, a semiconductor wafer to which the asset tag is attached, and the acknowledgment of the asset in each working stage indicates to the server that the next stage in the manufacturing process has been started. This enables the server to store information on manufacturing duration at each stage and the total manufacturing duration. Accordingly, it is possible to determined manufacturing costs on the basis of real expenses that may be measured with the manufacturing duration. It is also possible to determine bottlenecks of the manufacturing process. In such embodiment, the transmission of the request and the permission admitted by the server may be omitted in order to expedite and simplify the process. However, if a given stage in the manufacturing process should be controlled centrally by the server, e.g. the stage cannot be started before a specific event, the server may be in control of the start of the stage, and the stage may be configured to be started only after the permission from the server. Accordingly, the user tag and/or asset tag may be configured to request the permission to start the process before signaling to the user that the usability status of the asset tag has been changed. In general, the change of the usability status of the asset may in some of the stages of the manufacturing process be made without requesting the permission from the server, while other stages of the manufacturing process may require the permission from the server.

The usability status may be a maintenance status of the asset. In such embodiments, the asset may be marked as needing maintenance or repair conveniently in the location. As a consequence, the asset tag may be configured to reject reservation or use of the asset, e.g. the rejection may be output through a user interface (a light or an audio signal). The need for maintenance may also be registered by the server, and the server may be configured to alert a maintenance crew to carry out the maintenance. In general, the embodiments of the invention allow the user of the user tag to change the usability status of the asset conveniently.

Figure 3:
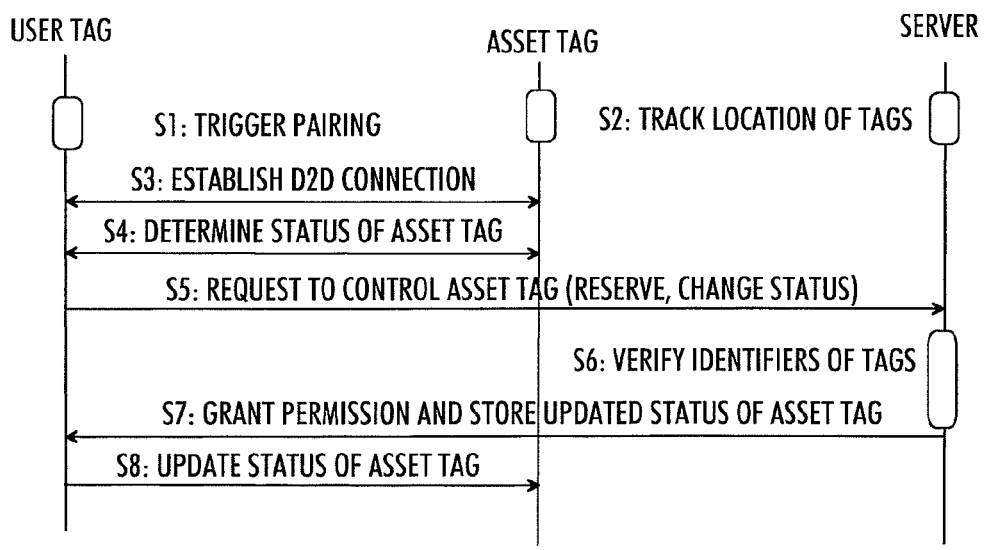
FIGS. 3 and 4 illustrate embodiments for carrying out the change of the usability status of the assets.

FIG. 3 illustrates a signaling diagram related to an embodiment of the process of FIG. 2. Referring to FIG. 3, the pairing of the user tag and the asset tag is triggered in step S1. With respect to the user tag, step S1 may comprise a user input through a user interface of the user tag, wherein the user activates a control mode of the user tag by pressing a given button, for example. In response to the detection of the user input, the user tag may be configured to start the connection establishment, e.g. by initiating an inquiry scan process of Bluetooth. The user tag may also be configured to output a signal indicating the initialization of the control mode, e.g. an audio output and/or a visual output. Upon starting the control mode, the user may bring the user tag close to the asset tag. The asset tag may comprise a proximity detector, e.g. a Hall sensor, responsive to magnetic and/or electromagnetic fields detectable by the proximity sensor. The proximity detector may be triggered by the proximity of the user tag, e.g. within a few centimeters or a dozen centimeters from the asset tag. As a consequence, the proximity sensor may output a signal activating the asset tag to start the connection establishment, e.g. by configuring the asset tag to transmit Bluetooth inquiry request messages. In another embodiment, the asset tag may be triggered to start the connection establishment according to another input, e.g. through user input through an input device of the asset tag (the user presses a button comprised in the asset tag, for example). In order to enable connection to a correct asset tag, a communication range of the asset tag may be set to be a few dozens centimeters, e.g. 10 to 40 cm and/or less than a meter. This may be carried out by setting a transmission power of a connection establishment procedure triggered by the proximity sensor to be lower than in other connection establishment procedures, e.g. connection establishment to the LTS nodes. In S3, the D2D connection is established between the user tag and the asset tag. In the embodiment using the Bluetooth, e.g. Bluetooth version 2.x, upon reception of the inquiry request from the asset tag, the user tag may be configured to transmit an inquiry response message which may be an extended inquiry response (EIR) message comprising specific field (EIR data) to which arbitrary information may be included. In an embodiment, the EIR data may comprise an information element indicating that the transmitter of the inquiry response is attempting a connection with an asset tag in order to change the availability status of the asset tag. On the other hand, the asset tag may be configured to establish the connection only to those devices that comprise such special information element. For example, if the asset tag detects another connection establishment message not including such a special field that identifies the user tag and search for an asset tag, the asset tag may be configured not to accept such a connection. Upon accepting the inquiry response message received from the user tag, the asset tag and the user tag may be configured to establish a Layer 2 Logical Link Control and Adaptation Protocol (L2CAP) connection in S3.

In S4, the asset tag may be configured to determine its availability status, and include an information element indicating the current availability status to a message transmitted to the user tag. S4 may be part of step S3, i.e. the message is transmitted in connection with the connection establishment, or S4 may be carried out after S3. The asset tag may also transmit its identifier, e.g. a Bluetooth device identifier, in S4. Each tag of the LTS may have an identifier comprising a portion which is common to all tags of the LTS and a portion which is unique for each device. This enables quick identification and detection of devices that belong to the LTS.

Meanwhile, the server carries out location tracking of user tags and asset tags active in the LTS in step S2. This may be a continuous process carried out by the server in order to keep record about the locations of personnel and equipment.

In S4, if the availability status is such that its change is not possible by the user tag, e.g. the asset has already been reserved or it needs maintenance, the user tag may terminate the control mode. On the other hand, if the availability status of the asset tag indicates that it may be changes by the user tag, e.g. the asset is free for use and operational, the process proceeds to step S5 in which the user tag communicates with the server in order to request to control the asset tag so as to change its availability status. The request may also comprise information what type of change is to be carried out (reservation, maintenance, etc.) Step S5 may comprise transmission of the identifier of the asset tag and a corresponding identifier of the user tag to the server. In S6, the server may analyze the identifiers so as to verify that the user tag attempting to control the asset tag belongs to the LTS. This provides improved security, because the assets cannot be reserved with tags that belong to a different LTS. The server may also determine whether or not the user tag is provided with rights to change the availability status of the asset tag. For example, certain users may reserve only certain equipment, or certain asset(s). Upon detecting that the user tag belongs to the LTS and that it can be allowed to change the availability status of the asset as requested, the server transmits a request granted message to the user tag in S7. On the other hand, if the server detects that the user tag does not belong to the LTS and/or that it cannot be allowed to change the availability status of the asset as requested, the server transmits a request denied message to the user tag in S7. The server may also transmit a similar permission granted message to the asset tag in order to let the asset tag to know that the user tag is permitted to control the asset tag. The server may also update the new status of the asset tag to its database. In response to the request denied message, the user tag terminates the process. In response to the request granted message, the user tag commands the asset tag to update the availability status in S8. In response to the command, the asset tag updates the availability status as commanded by the user tag in S8. Upon completion of the process, both the user tag and the asset tag may return to normal location tracking mode in which they periodically update their location through communication with the server, as described above.

It should be understood that the embodiment described above is merely one implementation of the general concept of the present invention. For example, the user tag may in S5 send a general request to change the availability status of the asset tag without specifying whether the request relates to the reservation of the asset tag or to another type of configuration. Similarly, the server may in S7 grant the permission if it has been determined that the user tag is qualified to carry out the configuration. In response to the permission in S7, the user tag may output a permission notification through the user interface of the user tag, e.g. through a display of the user tag. As a consequence, the user of the user tag may then use the user interface to select a desired option, e.g. to reserve the asset, to change operational status of the asset tag ("needs maintenance", "needs disinfection") etc. In response to the user selection received as an input through the user interface, the user tag is configured to carry out S8 together with the asset tag. Upon completion of S8, the master tag may be configured to transmit the results of the operation to the server in order for the server to update the availability status of the asset tag. The user tag may also output a notification about the completed process through the user interface.

Accordingly, the asset tag and the user tag may carry out the change of the usability status of the asset tag without involving the server in the process. After the usability status of the asset tag has been changed, the asset tag may be configured to send its current status to the server in a location update message described above. In some embodiments, the server does not monitor the usability status of the asset tags and, in such embodiments, it is not necessary to send any message relating to the change of the usability status to the server.

In another embodiment, the user tag is configured to transmit the request to change the usability status of the asset tag to the asset tag, and the asset tag is configured to forward the request to the server. The server may then communicate the permission to the asset tag, and the asset tag may forward the permission to the user tag. In yet another embodiment, the asset tag comprises a list of user tags allowed to change the usability status of the asset tag. In such embodiments, the user tag is configured to request for the change of the usability status from the asset tag, and the asset tag may verify whether or not the user tag is comprised in the list of allowed user tags. If the user tag exists in the list, the asset tag allows the change of the usability state. Then, the asset tag may communicate the updated status to the server, and the server may update its databases with the new status of the asset tag. If the user tag is not allowed to control the asset tag, the asset tag rejects the request. In yet another embodiment, the establishment of the D2D connection may be an implicit indication that the user tag requesting the D2D connection intends to reserve the asset tag. In such an embodiment, the asset tag may automatically transmit the request for changing the reservation status of the asset tag to the server together with the identifier of the user tag. In such an embodiment, no request from the user tag to the server is needed. The server may respond to the asset tag, and the asset tag may forward the result of the request to the user tag.

Figure 4:
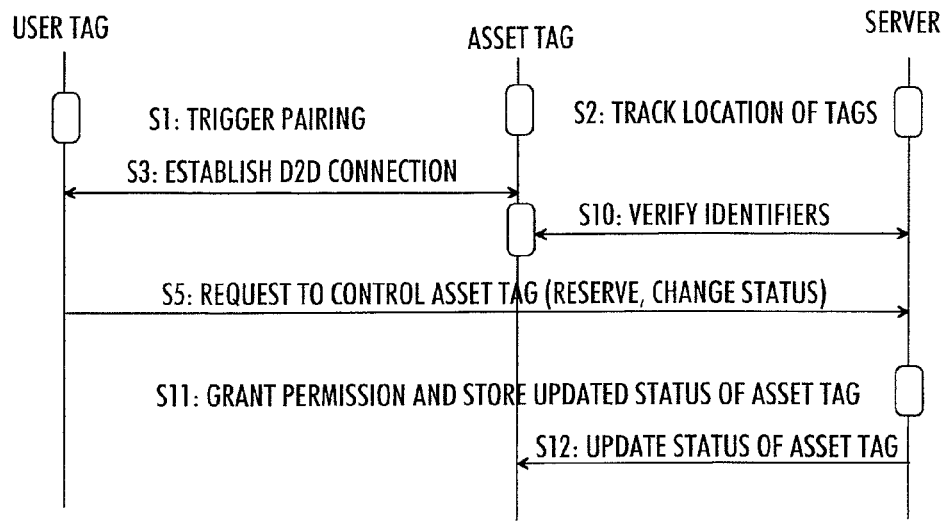

FIG. 4 illustrates an embodiment which is an alternative to the embodiment of FIG. 3. The same or corresponding steps are denoted with the same reference symbols as in FIG. 3. Accordingly, the D2D connection between the user tag and the asset tag is established in steps S1 and S3, and the server carries out the location tracking in S2. In this embodiment, the asset tag is configured to verify the identity of the user tag attempting to change the availability status of the asset tag. As a consequence, the asset tag is configured to verify that the user tag belongs to the same group, e.g. the same LTS, with the asset tag. This may be carried out by analyzing the identifier of the user tag transferred to the asset tag in S3. The asset tag may carry out the verification itself, and/or it may forward the identifier of the user tag and the identifier of the asset tag to the server, and the server may be configured to carry out the analysis and report the result. If the user tag is determined to belong to the same group and/or to a group allowed to control the asset tag, the asset tag may be configured to complete the connection establishment. In response to the completed D2D connection, the user tag may carry out step S5, and the server may grant or deny the change of the usability status of the asset in S11. In this embodiment, the server may be configured to configure the asset tag to change its availability status in S12 according to the request received from the user tag in S5. In other words, steps S7 and S8 of FIG. 3 is replaced by steps S11 and S12 in which the server communicates with the asset tag so as to change the usability status of the asset tag.

It should be appreciated that features of embodiments described above with reference to FIGS. 3 and 4 may be combined, e.g. steps S7 and S8 may be carried out in the embodiment of FIG. 4 instead of steps S11 and S12. With respect to the verification, both the user tag and the asset tag may be configured to carry out the verification on the basis of an identifier of the other device received in S3. Such an embodiment provides a double protection for the verification.

Figure 5:
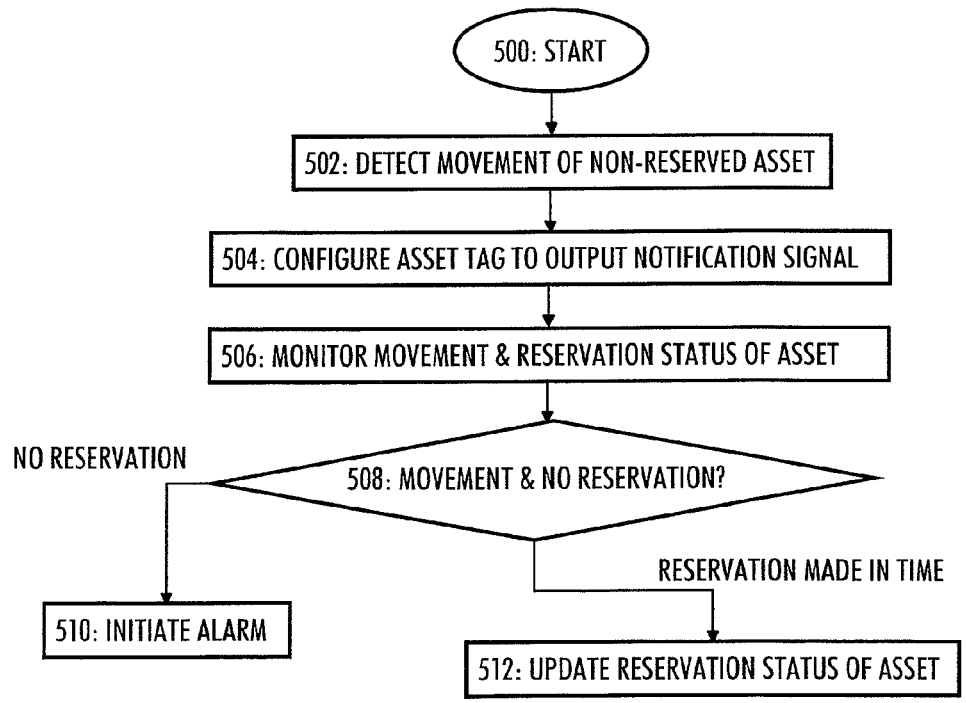
FIG. 5 illustrates monitoring the movement and reservation status of an asset according to an embodiment of the invention.

FIG. 5 illustrates an embodiment combining features of the location tracking and reservation maintenance. The process may be carried out in the server according to an embodiment of the invention. The process starts in block 500, and the server is configured to monitor the movement and location of assets comprised in the LTS by monitoring the location updates associated with asset tags attached to the assets. Particularly, the server monitors the location of a given asset that has not yet been reserved. In block 502, the server receives and detects a location update that indicates that non-reserved asset is moving. This may be detected upon detection of a change in a LTS node associated with the asset tag of the asset. The server may be configured to monitor whether the movement continues (the location updates to a further LTS node) or whether the asset remained stable and location update related to attenuation in a radio channel, between the asset tag and the initial LTS node. If the location updates back to the initial LTS node or the location is maintained in the new LTS node for a determined time period, the server may determine that the asset is not moving. On the other hand, if the asset tag is detected to update its location to a further LTS node within the determined period, the server may determine that the asset is moving without proper authorization, e.g. the reservation, and the process proceeds to block 504 in which the server transmits a command message to the asset tag, thereby configuring the asset tag to output a notification signal through its user interface, e.g. an audio signal (beep) and/or a visual signal (a flashing light). Accordingly, a person moving the asset is notified that no valid reservation has been made. In block 506, the server keeps monitoring the movement of the asset. In block 508, if it is determined whether or not a valid reservation has been made in time. The "time period" may be an actual time period counted by the server from the execution of step 504, or it may be measured in terms of a detected distance moved by the asset after step 504. Any other measure of duration or interval may be used. This gives time for the user moving the asset to either leave the asset intact or to make a valid reservation. Upon determining that the asset is still moving and no valid reservation has been made in block 508, the process proceeds to block 510 in which the server initiates an alarm so as to alert security personnel about a possible attempted robbery. The server may continuously provide the security personnel with update location of the asset through communication between the server and user tags and/or other communication devices of the security personnel. On the other hand, if the server determines in block 508 that a valid reservation has been made, the process proceeds to block 512 in which the server updates the reservation status of the asset (see steps S7 and S12) in its database. The server may also transmit to the asset tag another control message configuring the asset tag to cease the output of the notification signal.

The embodiment of FIG. 5 enables the LTS to perform an alarm while the asset moved without a proper authorization is still within the coverage area of the LTS. Some conventional methods alarm only at the stage where the asset tag is detected no more, which may be too late. The embodiment also enables a user who forgot to make the reservation to correct the mistake before the actual alarm is raised. This reduces the occurrence of false alarms.

Figure 6:
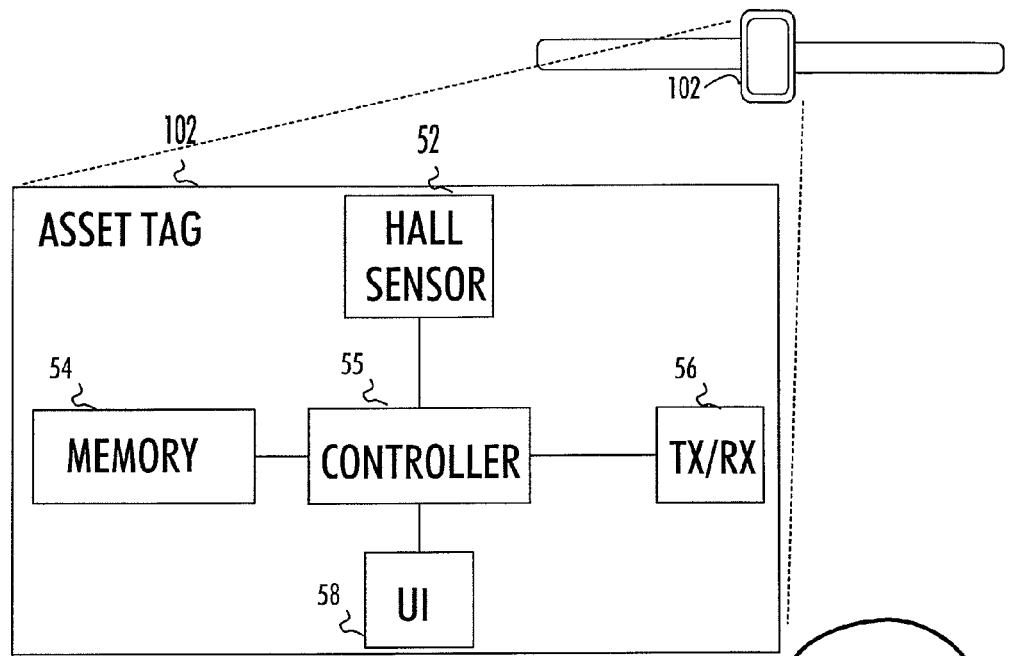
FIGS. 6 to 8 illustrate apparatuses according to embodiments of the invention.
Figure 7:
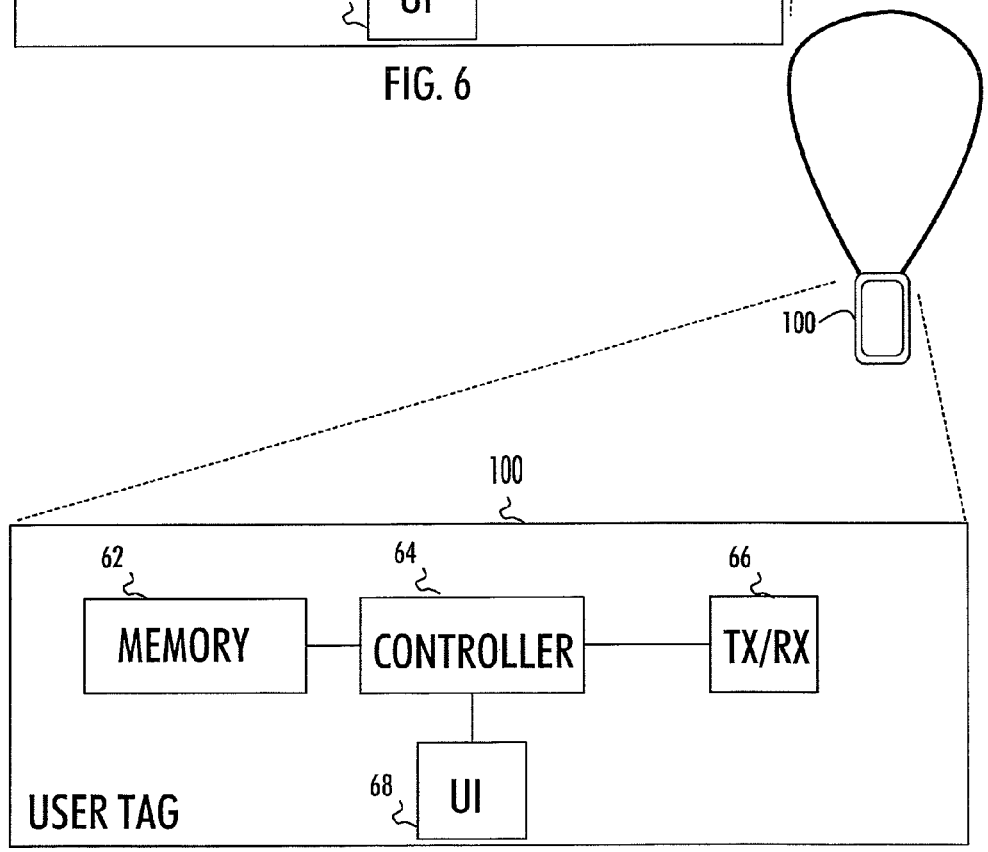

FIGS. 6 and 7 illustrate wireless communication devices according to embodiments of the invention. FIG. 6 illustrates an embodiment of the asset tag 102, which may be a slave tag. The asset tag 102 may comprise a casing and a strap used for attaching the asset tag 102 to an asset, e.g. a wheelchair, or electronic equipment. It should be noted that other means for attaching the asset tag 102 to the asset are possible. The asset tag 102 may comprise in the casing a Hall sensor 52 configured to output a signal triggering the establishment of the D2D communication connection upon detection of a determined change in monitored magnetic field. The Hall sensor 52 may be connected to a controller circuitry 55 responsive to the signal received from the Hall sensor 52 and configured to initiate the establishment of the D2D connection and other procedures described above for the asset tag 102. The controller circuitry may comprise a processor configured by software read by the processor from a memory unit 54. The memory 54 may also store a current usability status of the asset tag in order to enable the processor to carry out step S4, for example. The asset tag 102 may further comprise a communication circuitry 56 configured to carry out the location updates and communication with respect to the usability status of the asset tag, as described above. The communication circuitry 56 may support Bluetooth communication technology, for example. The communication circuitry 56 may be configured to apply a plurality of transmission power levels depending on whether a radio communication connection is established with a user tag or with an LTS node, as described above. The asset tag 102 may further comprise a user interface 58 comprising a loudspeaker and/or a visual interface, e.g. in the form of lights or a display unit and, optionally, an input device comprising one or more buttons. The controller circuitry 55 and the communication circuitry 56 in cooperation may be understood as forming means for carrying out the above-described functionalities of the asset tag. In some embodiments, the means for carrying out the above-described functionalities of the asset tag may comprise other components of the asset tag (the Hall sensor, the user interface, etc.), depending on the embodiment.

FIG. 7 illustrates an embodiment of the user tag 100 which may be a master tag configured to control the asset tags 102. The user tag 100 may comprise a casing and a strap used for attaching the asset tag 100 around a neck or a wrist of a user in order to carry it conveniently. The asset tag 100 may equally be attached to another personal electronic device carried or worn by the user, e.g. a mobile phone, a laptop, or a piece of clothing. The user tag 100 comprises a communication circuitry 66 configured to enable communication connections with the asset tags and with the LTS nodes and the server in order to carry out the location tracking and the control of the asset tags according to embodiments of the invention. The user tag 100 may further comprise a controller circuitry 64 configured to control the operations of the user tag according to embodiments of the invention. The controller may be configured to carry out the process according to any embodiment described above in connection with the user tag 100. The controller circuitry 64 may comprise a processor configured by software read by the processor from a memory unit 62. The user tag 102 may further comprise a user interface 68 comprising an input device such as a keypad or buttons, output means such as a loudspeaker and/or a visual interface, e.g. in the form of lights or a display unit. In an embodiment, the user tag 100 comprises an interface to be connected to a counterpart interface of another electronic device, e.g. a mobile phone or a computer (laptop). In such embodiments, the user interface 68 of the user tag 100 may utilize an expanded user interface provided by the other electronic device. For example, the user tag itself may be provided with no display, but when the user tag 100 is connected to the other electronic device comprising a display, the controller circuitry 64 is configured to detect the connection and provide the user with a visual display, e.g. a menu, through the display of the electronic device. The controller circuitry 64 and the communication circuitry 66 in cooperation may be understood as forming means for carrying out the above-described functionalities of the user tag. In some embodiments, the means for carrying out the above-described functionalities of the asset tag may comprise other components of the user tag, e.g. the user interface, depending on the embodiment.

Figure 8:
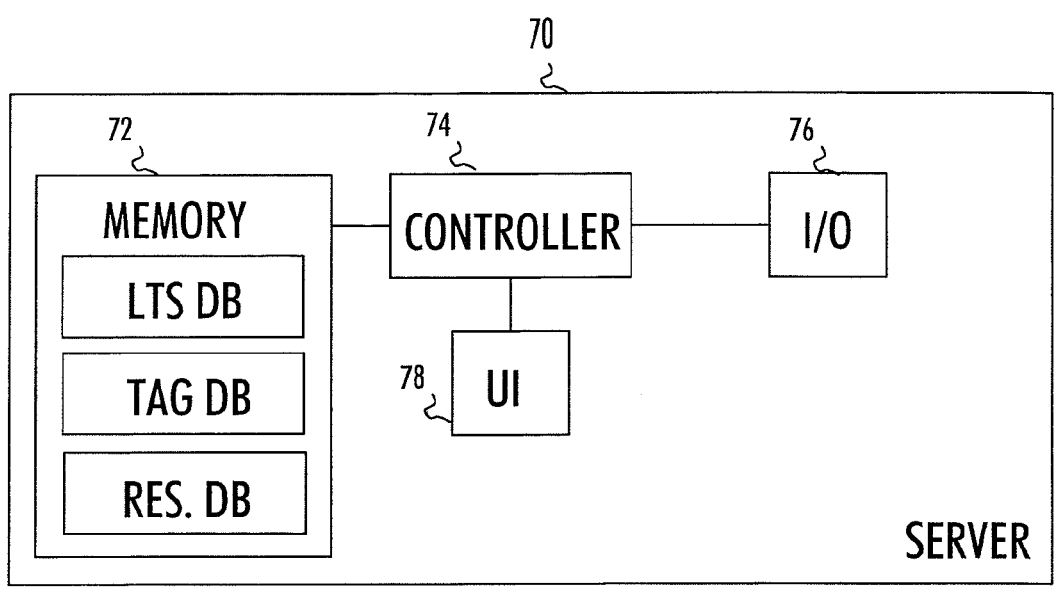

FIG. 8 illustrates a block diagram of an embodiment of the server 70. The server comprises an input/output (I/O) interface 76 enabling a communication connection with the wireless communication devices of the LTS, e.g. the user tags, asset tags, other tags, and the LTS nodes. The I/O interface 76 may provide the server with Internet protocol connectivity. The server 70 may further comprise a controller circuitry 74 configured to carry out the embodiments described above in connection with the server. The controller circuitry 74 may comprise a processor configured by software read by the processor from a memory unit 72. The memory unit 72 may also store databases needed for the implementation of the LTS and the variable availability states of the assets. The databases may comprise an LTS database storing current locations of the tags being location-tracked, a layout of the area in which the location tracking is carried out, etc. The memory 72 may further store a tag database storing identifiers of the tags comprised in the LTS and personal and asset information associated with the tags. This links tags to corresponding users and assets. The memory 72 may also store a reservation database storing information on reserved assets and respective reserving persons. This enables up-to-date maintenance of the reservation information. The memory may also store a maintenance database comprising those assets that need to be serviced. When a user tag changes the usability status of an asset to "needs maintenance", the server may update the maintenance database with an identifier identifying the asset. The memory 72 may be realized by a single memory device or a plurality of memory devices which may be structurally different including, for example but not limited to, a hard drive, a random access memory, and flash memory. The server 70 may further comprise a user interface comprising a display unit, a keyboard, a mouse, a loudspeaker, etc. The server may further comprise a user interface 78 comprising input means such as a keyboard and a mouse and output means such as a display unit and a loudspeaker.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in connection with FIGS. 2 to 5 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to location tracking systems defined above but also to other suitable location tracking systems. Communication protocols and specifications of location tracking systems, their elements and tags may vary and develop as the technology advances. Such development may require extra changes to the described embodiments. Therefore, all words and expressions should be interpreted broadly and they are intended to illustrate, not to restrict, the described embodiments. It will be obvious to a person skilled in the art that, as technology advances, the inventive concept can be implemented in various ways. The invention and its embodiments are not limited to the examples described above but may vary within the scope of the claims.

The invention claimed is:

1. A location tracking system comprising:
a server comprising at least one processor and at least one memory including program instructions, wherein the at least one memory and the computer program code are configured, with the at least one processor, to cause the server to track, in a coverage area of the location tracking system, locations of at least one user tag and at least one asset tag, and to communicate with the at least one user tag and the at least one asset tag;

an asset tag associated with an asset and comprising at least one processor and at least one memory including program instructions, wherein the at least one memory and the computer program code are configured, with the at least one processor, to cause the asset tag to establish a direct device-to-device wireless communication connection with a user tag, wherein the establishment comprises pairing the user tag and the asset tag; and said user tag associated with a person and comprising at least one processor and at least one memory including program instructions, wherein the at least one memory and the computer program code are configured, with the at least one processor, to cause the user tag to establish the direct device-to-device wireless communication connection with said asset tag, to trigger by the establishment of the wireless communication connection a process to change a usability status of the asset associated with the asset tag, and to use identifiers of the asset tag and the user tag obtained when pairing the asset tag and the user tag to link the user tag with the asset tag when changing the usability status of the asset.

2. A method for changing a usability status of an asset in a location tracking system, the method comprising:

establishing a direct device-to-device wireless communication connection between a user tag associated with a person and an asset tag associated with an asset in the location tracking system, wherein the user tag is used for monitoring the location of the person, and the asset tag is used for monitoring locations of the asset, and wherein the establishment comprises pairing the user tag and the asset tag;

triggering by the establishment of the wireless communication connection a process to change a usability status of the asset associated with the asset tag, wherein identifiers of the asset tag and the user tag obtained when pairing the asset tag and the user tag are used to link the user tag with the asset tag when changing the usability status of the asset.

3. The method of claim 2, the process to change a usability status of the asset further comprising:

requesting, by the user tag, for a permission to change the usability status of the asset, wherein the request is transmitted over the established direct device-to-device communication link from the user tag to the asset tag and/or over another communication link established between a server and at least one of the user tag and the asset tag; and in response to the permission to change the usability status of the asset, configuring the asset tag and/or the server to change the usability status of the asset.

4. The method of claim 2, further comprising:

providing the user tag and the asset tag with an identifier that indicates that the user tag and the asset tag belong to the same location tracking system;

verifying, before the permission to change the usability status, that the user tag and the asset tag belong to the same location tracking system by analyzing the identifiers of the user tag and the asset tag;

upon detecting that the user tag and the asset tag belong to the same location tracking system on the basis of the analysis of the identifiers, proceeding with the process for changing the usability status of the asset tag; and upon detecting that the user tag and the asset tag do not belong to the same location tracking system on the basis of the analysis of the identifiers, terminating the process for changing the usability status of the asset tag.

5. The method of claim 2, wherein the usability status is a reservation status of the asset, and wherein the process for changing the reservation status of the asset comprises:

requesting for permission to reserve the asset to the person associated with the user tag;

in response to the permission to reserve the asset, storing in a server maintaining reservations of a assets comprised in the location tracking system, a reservation record comprising information that the asset is reserved by the person associated with the user tag, and configuring the asset tag to change its status to a reserved status.

6. The method of claim 2, wherein the usability status is a reservation status of the asset, and wherein the method further comprises:

monitoring, by a server, the location of the asset tag; and in response to detecting movement of the asset tag when the reservation status indicates that the asset has not been reserved, configuring the server to initiate a process for raising an alarm.

7. The method of claim 6, further comprising in the process for raising the alarm:

transmitting a control message to the asset tag, thereby configuring the asset tag to output a notification signal through a user interface of the asset tag;

upon carrying out the process for changing the reservation status of the asset, configuring the asset tag to cease the output of the notification signal; and upon determining that the process for changing the reservation status of the asset has not been made according to predetermined rules after transmission of the control message, raising an alarm by the server.

8. The method of claim 2, wherein the usability status is a reservation status of the asset, the method further comprising:

upon completed reservation of the asset, terminating the direct device-to-device wireless communication connection;

in connection with release of the reservation, reestablishing the direct device-to-device wireless communication connection, thereby triggering the asset tag to change its reservation status to indicate that the asset is free for reservation.

9. The method of claim 2, wherein the direct device-to-device connection consists of a radio link between the asset tag and the user tag.

10. The method of claim 9, wherein the direct device-to-device connection is a short-range radio link having a range less than a meter.

11. The method of claim 2, wherein the establishment of the direct device-to-device connection comprises pairing the user tag and the asset tag, wherein the pairing comprises:

transmitting, by the user tag, a connection establishment message comprising an information element that indicates that the user tag intends to change the usability status of the asset tag;

accepting, by the asset tag, connection with only those user tags from which such a connection establishment message comprising the information element is received.

12. The method of claim 2, wherein the asset tag is configured to use a lower transmission power when establishing the direct device-to-device wireless communication connection with the user tag than a transmission power applied when establishing a wireless communication connection with a location tracking system node comprised in the location tracking system to cover a portion of an area where the location tracking is performed.

13. The method of claim 2, wherein the change of the usability status refers to marking the asset as to need maintenance or repair.

14. A wireless communication device comprising:
   at least one processor; and
   at least one memory including program instructions, wherein the at least one memory and the computer program code are configured, with the at least one processor, to cause the apparatus to establish a direct device-to-device wireless communication connection between a user tag associated with a person and an asset tag associated with an asset in the location tracking system, wherein the user tag is used for monitoring the location of the person, and the asset tag is used for monitoring locations of the asset, to pair the user tag and the asset tag during the establishment of the direct device-to-device wireless communication connection, to trigger by the establishment of the wireless communication connection a process to change a usability status of the asset associated with the asset tag, and to use identifiers of the asset tag and the user tag obtained when pairing the asset tag and the user tag to link the user tag with the asset tag when changing the usability status of the asset.

* * * * *